United States Patent [19]

Darlington et al.

[11] Patent Number: 4,465,598

[45] Date of Patent: Aug. 14, 1984

[54] METHOD OF TREATING WELL SERVICING FLUIDS

[75] Inventors: Roy K. Darlington; George Henry, Jr.; Jack L. Lowell, all of Houston, Tex.

[73] Assignee: NL Industries, Inc., New York, N.Y.

[21] Appl. No.: 458,191

[22] Filed: Jan. 17, 1983

[51] Int. Cl.³ .............................................. C02F 1/52
[52] U.S. Cl. ..................................... 210/721; 210/722; 210/724; 210/754; 210/759; 210/912; 210/913
[58] Field of Search ............... 210/722, 721, 720, 912, 210/913, 754, 759, 747, 170, 758, 724

[56] References Cited

U.S. PATENT DOCUMENTS

| | | | |
|---|---|---|---|
| 3,649,532 | 3/1972 | McLean | 210/722 |
| 3,649,533 | 3/1972 | Reijonen et al. | 210/722 |
| 4,016,075 | 4/1977 | Wilkins | 210/712 |

FOREIGN PATENT DOCUMENTS

| | | | |
|---|---|---|---|
| 722848 | 3/1980 | U.S.S.R. | 210/722 |
| 732211 | 5/1980 | U.S.S.R. | 210/722 |

*Primary Examiner*—Benoît Castel
*Attorney, Agent, or Firm*—Browning, Bushman, Zamecki & Anderson

[57] ABSTRACT

A method for removing heavy metals from brines used as well servicing fluids in which the heavy metal is oxidized to a higher, stable oxidation state of +3 or greater, the oxide or variants thereof of the oxidized metal is formed resulting in a generally water insoluble precipitate which is then removed by filtration leaving the brine free of deleterious amounts of the heavy metal.

8 Claims, No Drawings

METHOD OF TREATING WELL SERVICING FLUIDS

BACKGROUND OF THE INVENTION

The present invention relates to the treatment of well servicing fluids such as workover and completion fluids used in the oil and gas industry. More particularly, the present invention relates to the removal of certain heavy metals from generally solids-free brines used as well servicing fluids.

Clear, solids-free brines are commonly used as completion and workover fluids in the oil and gas industry. Such brines generally comprise aqueous solutions of heavy metal salts such as calcium chloride, calcium bromide, zinc chloride, zinc bromide, and various mixtures thereof, and may or may not contain viscosifiers. Typically, such brines are devoid of weighting agents, e.g. barite, and thus are commonly referred to as being clear and solids-free. Because the heavy metal salts and hence the brines from which they are made are relatively expensive, it is desirable to treat used brines to remove unwanted solids and impurities so that they can be reused in further completion and workover operations. It frequently happens that the used brines become contaminated with certain heavy metals, e.g. iron, which renders them unsuitable for use in either completion or workover operations. While this contamination may occur while the brine is being used, it also is possible for the brine to be contaminated prior to usage from storage tanks, transport vessels and the like.

The presence of heavy metals, more specifically heavy metal ions dissolved in the brines, poses a problem inasmuch as such ions, particularly under the conditions existing in the borehole, frequently precipitate out as the oxide or hydroxide thereof when they contact the formation or mix with formation water. This can result in formation damage. For example, the precipitated heavy metal oxides and/or hydroxides can build up filter cake on the wall of the borehole preventing or severely reducing production from the producing zone. Accordingly, a method for removing such undesirable heavy metals from the brines prior to use or reuse is desirable.

SUMMARY OF THE INVENTION

It is therefore an object of the present invention to provide a method for removing certain heavy metals from well servicing fluids such as workover and completion fluids.

It is a further object of the present invention to provide a method for removing certain heavy metals from heavy brines.

The above and other objects of the present invention will become apparent from the description given herein and the appended claims.

The method of the invention involves the addition to the well servicing fluid of an effective amount of an oxidizing agent which is sufficiently strong enough to oxidize the heavy metal impurities to a higher oxidation state and forming a generally water insoluble compound of the oxidized metal, the water insoluble compound generally being the oxide, the hydrated oxide or the hydroxide of the oxidized form of the metal. The generally water insoluble compound is then removed from the well servicing fluid by means such as filtering, centrifuging or the like. The method of the present invention is directed to elements of the first transition series and, more specifically, to such metallic elements which form stable oxidation states of +3 or greater. Particularly important metals include iron, chromium, cobalt, nickel and manganese, especially iron.

DETAILED DESCRIPTION

The well servicing fluids which are treated in accordance with the method of the present invention can be any clear, normally, substantially solids-free fluid which is used in well servicing operations such as completions and workovers. It is, however, particularly directed toward brines which are clear and generally solids-free in nature and which are generally comprised of aqueous solutions of halide salts of calcium and zinc, especially calcium chloride, calcium bromide, zinc chloride, zinc bromide, and mixtures thereof. Such salts, in various combinations, are used to prepare what are known as "heavy brines" which are extensively used in completion and workover operations. The heavy brines may vary in density from about 12 pounds per gallon (ppg) to about 19 ppg. The method of the present invention is useful with non-viscosified brines or with brines which contain a viscosifying agent such as hydroxyethyl cellulose. Indeed, it is a particular feature of the present invention that the heavy metals can be removed from viscosified brines, e.g. brines containing hydroxyethyl cellulose or similar viscosifying agents.

The heavy brines to which the method of the present invention is primarily directed are relatively highly corrosive in nature to ferrous and ferrous-based metals. Accordingly, during use, transportation or storage, significant amounts of iron, nickel, chromium and similar metals used in the manufacture and fabrication of the metallic components with which the brine comes in contact are solubilized, in one form or another and, depending upon the length of contact time with the metal, temperature, pH and other such parameters, can build to significant levels in the brine. The presence of relatively small amounts of such heavy metals, e.g. greater than 100 ppm, can render the brine useless in completion and workover operations. Such heavy metals, particularly under the conditions existing in the borehole, are readily converted to generally water insoluble hydroxides or oxides which can cause formation damage and/or result in plugging of casing perforations leading to a producing zone.

The heavy metals to which the method of the present invention is directed are those metals in the first transition series of the Periodic Table which have a stable oxidation state of +3 or higher. Generally speaking, the term "stable oxidation state" refers to an oxidation state of the metal which allows a solid oxide, hydrated oxide or hydroxide (collectively referred to as oxide) thereof to be recovered from an aqueous solution of suitable pH. Of primary importance are metals such as iron, chromium, cobalt, nickel, manganese and mixtures thereof as these metals are most commonly found in the tubing, casing and wellhead equipment used in completion and workover operations as well as in the storage and transportation tanks used for the brines. In accordance with the present invention, the water soluble ions of such heavy metals are oxidized as hereafter taught and a generally water insoluble compound thereof formed, the water insoluble compound being removed from the brine to render the brine free of deleterious amounts of the heavy metals.

The oxidizing agents which are useful in the present invention can comprise any oxidizing agent which is sufficiently strong enough to oxidize the targeted metal ion(s) to the desired oxidation state and which has no significant, deleterious action on the components of the brine such as to render the brine unfit for use. Non-limiting examples of suitable oxidizing agents include water soluble salts of anions such as bromate, peroxysulfate, hypochlorite, chlorate, iodate, percarbonate, perborate, etc. Also useful are compounds such as hydrogen peroxide and organic oxidants such as BROMICIDE, marketed by Great Lakes Chemical. Especially useful are the alkali metal salts of such anions as, for example, sodium bromate, potassium peroxysulfate, etc. It will be understood that the particular oxidizing agents selected need only be sufficiently strong to oxidize the undesired heavy metal impurity in the brine. Thus, the brine can be analyzed prior to treatment to determine which heavy metal(s) are present and a suitable oxidizing agent(s) selected to effect the desired oxidation. Accordingly, mixtures of oxidizing agents may be employed depending on the types and amounts of heavy metal(s) present in the brine.

It will be recognized that the amount of oxidizing agent employed will be an effective amount, i.e. an amount sufficient to oxidize the heavy metal ions, and subsequently form water insoluble compounds thereof, such that the remaining level of such unoxidized heavy metal ions permits the brine to be used in normal completion and workover operations. As a practical matter, as will be recognized, reduction of the amount of the heavy metal ions to zero is virtually impossible and unnecessary to render the brine usable.

Generally speaking, the water insoluble compound which is formed upon oxidation of the heavy metal ion is the oxide, the hyrated oxide or the hydroxide. It is to be understood that such oxides, hydrated oxides and/or hydroxides (collectively referred to as oxides) can be complex in nature and their particular molecular structure is not important so long as they are substantially water insoluble and can be removed from the brine by mechanical methods such as filtration, centrifugation, decantation or the like. While the pH of the brines normally employed is sufficiently high enough such that the water insoluble oxide(s) of the heavy metal will form once it has been oxidized to the higher, stable oxidation state, if necessary the pH can be raised to the point necessary for the oxide to form. Suitable basic substances which can be employed to adjust the pH include alkali metal hyroxides such as sodium hydroxide; alkaline earth metal hydroxides such as calcium hydroxide, magnesium hydroxide, etc; ammonium hydroxide and similr basic materials. It will be appreciated that the amount of basic material added, if necessary, will depend upon the pH necessary to effect formation and precipitation of the water insoluble oxide which in turn depends upon which heavy metal(s) is present, the amount of such heavy metal(s), etc.

To more fully illustrate the present invention, the following non-limiting examples are presented:

EXAMPLE 1

A 16 ppg brine containing calcium chloride, calcium bromide and zinc bromide and which had been in field use was analyzed and found to contain 1940 ppm iron making it unfit for further use. To this brine was added sodium bromate in an amount to provide a concentration in the brine of 0.588 ppg. Following addition of the sodium bromate, a red precipitate (ferric oxide and/or various hydrated forms thereof) formed. The precipitate was filtered from the brine and the brine again analyzed and found to contain 9 ppm iron.

EXAMPLE 2

The brine of Example 1 was treated with sufficient potassium peroxysulfate to provide a concentration in the brine of 3.2 ppb. This resulted in the formation of a red precipitate which was removed by filtration. The thus treated brine contained 6 ppm iron.

EXAMPLE 3

A 13 ppg brine containing calcium chloride and calcium bromide was returned from field use contaminated with 500 ppm iron. This brine was treated with sodium bromate (0.588 ppg in the brine), and calcium hydroxide (1 ppg in the brine) to raise the pH. A precipitate was formed and removed by filtering from the brine. The thus treated brine was found to contain 86 ppm iron.

As can be seen from the above example, the method of the present invention is quite effective in reducing the levels of heavy metals in brines used in workover and completion operations. Indeed, with particular reference to Examples 1 and 2, it can be seen that the iron in contaminated brines can be virtually eliminated employing the method of the present invention.

The foregoing disclosure and description of the invention is illustrative and explanatory thereof, and various changes in the method steps may be made within the scope of the appended claims without departing from the spirit of the invention.

What is claimed is:

1. A method of removing heavy metal impurities from an aqueous well servicing fluid comprising adding to said fluid an effective amount of an oxidizing agent having a strength sufficient to oxidize water soluble ions of said heavy metal to a higher oxidization state, forming a generally water insoluble compound of the oxidized form of said heavy metal ion, said heavy metal comprising a transition element having a +3 or higher stable oxidation state, and removing said water insoluble compound from said fluid, said fluid comprising a heavy brine having a density of from about 12 to about 19 pounds per gallon and comprising an aqueous solution of a material selected from the class consisting of calcium chloride, calcium bromide, zinc chloride, zinc bromide, and mixtures thereof.

2. The method of claim 1 wherein said heavy metal is selected from the class consisting of chromium, manganese, iron, cobalt and nickel.

3. The method of claim 1 wherein said oxidizing agent is selected from the class consisting of (i) a water soluble salt of an anion selected from the class consisting of bromate, peroxysulfate, hydrochlorite, chlorate, iodate, percarbonate, perborate, (ii) hydrogen peroxide, (iii) organic oxidants, and mixtures thereof.

4. the method of claim 3 wherein said oxidizing agent is an alkali metal bromate.

5. The method of claim 1 including adjusting the pH with a basic material to effect formation of said insoluble compound.

6. The method of claim 1 wherein said water insoluble compound is removed by filtering.

7. The method of claim 1 wherein said fluid contains a viscosifying agent.

8. The method of claim 7 wherein said viscosifying agent comprises hydroxyethyl cellulose.

* * * * *